United States Patent [19]
Koda

[11] Patent Number: 4,971,269
[45] Date of Patent: Nov. 20, 1990

[54] PROTECTION FOR SPACECRAFT

[76] Inventor: Manabu Koda, 16-11, Takaidohigashi,2-chome, Tokyo, Japan

[21] Appl. No.: 462,030

[22] Filed: Jan. 8, 1990

Related U.S. Application Data

[63] Continuation-in-part of Ser. No. 274,939, Nov. 9, 1988, abandoned.

[30] Foreign Application Priority Data

Mar. 16, 1987 [JP] Japan .................. 62/60855

[51] Int. Cl.$^5$ ............................................. B64G 1/00
[52] U.S. Cl. ............................. 244/158 R; 244/128; 244/121
[58] Field of Search .............. 244/158 R, 159, 127, 244/128, 121; 206/213.1, 525; 220/426; 343/705, 706, DIG. 2; 52/2

[56] References Cited

U.S. PATENT DOCUMENTS 1,001,892  8/1911  Rund ................................. 244/128
1,900,744  3/1933  Strobl ............................... 244/128
3,260,020  7/1966  Patin ................................. 52/2 E

FOREIGN PATENT DOCUMENTS 1158848  12/1963  Fed. Rep. of Germany ...... 244/158

Primary Examiner—Sherman Basinger
Assistant Examiner—Christopher P. Ellis
Attorney, Agent, or Firm—Moonray Kojima

[57] ABSTRACT

A spacecraft having a plurality of concentric balloons (1a,1b), 1c) as protection means, wherein inside the innermost balloon (1c) is located a spacecraft (2) or living facility for human being, together with adequate gaseous material favorable for such equipment or human activity. The outer balloons having progressively lower gas pressures. The multiple balloon system has improved degree of protection against cosmic vacuum environment, improved degree of prevention of escaping of material, with less pressure difference across each balloon membrane and more mechanical strength as compared with a single balloon system. Strings (3a,3b) or similar support members are placed in each inter-balloon space so as to prevent touching or cling of the balloons.

12 Claims, 2 Drawing Sheets

PROTECTION FOR SPACECRAFT

FIELD OF INVENTION

This a continuation in part of SN 274,939 filed Nov. 9, 1988, now abandoned.

This invention relates to a method and means for protecting a spacecraft, or a spacecraft protected by such method and means in a space environment. The invention allows the spacecraft to be in a gaseous environment at a certain pressure instead of being in pure vacuum of outer space.

BACKGROUND OF THE INVENTION

Spacecrafts, like orbital satellites, in general, have been left alone and exposed to free space vacuum. This is mainly due to the inherent function performed thereby, such as use of unrestricted propulsion or attitude control, and undisturbed transmission and receipt of electromagnetic waves or light waves. However, such vacuum exposure requires that the spacecraft have some protection against such vacuum environment. This means that the outer surface material of the spacecraft cannot be made of materials which are commonly used and readily available on the ground. Also the outer structure must withstand internal pressures if the purpose of the space craft is to carry and include some living being inside with the presence of certain pressure of air or similar gas. Such requirements must be satisfied within available limitations of mass or weight, as well as the above mentioned vacuum proof structure.

OBJECT OF THE INVENTION

It is an object of this invention to position the spacecraft and its load, such as electronic components, thermodynamic or biochemical equipment, or living beings, or any combination thereof, within a protected environment having certain degree of gas pressure. This enables the spacecraft to have considerably improved degree of protection against the space vacuum environment than when the spacecraft is exposed directly to the vacuum. This also enables the spacecraft and its variety of load to be used with much more favorable results than is the case of a spacecraft being directly exposed to vacuum.

Another object of the present invention is to prevent external hazardous material or irradiation of energy to attack directly the spacecraft. Such hazardous material or energy may be, for example, small cosmic particles of natural or artificial origin, ultraviolet portion of sunlight, or material "wind" from the sun.

A further object of this invention is to prevent particles from flying away from the spacecraft, such particles being exhaust material, and components which are demounted from the spacecraft.

DISCLOSURE OF THE INVENTION

A feature of the invention is to use a balloon or balloon-like structure to protect the spacecraft with the balloon being inflated with a gaseous material, and surrounding the spacecraft.

A further feature of the invention is to use a plurality of balloons of different sizes with progressively larger balloons surrounding each other with the balloons having progressively higher pressures going toward the center innermost balloon. This structure enables each balloon to have less pressure difference between the inside and outside than the case when only one balloon or pressure chamber is used. This reduces considerably the requirement for mechanical strength of each balloon and provides mechanical safety. This is because even if one of the balloons breaks down or is perforated, the remaining balloons do not break down or perforate and hence there is no total break down of the protection system due to such multiple layers of balloons. The outermost balloon facing the exterior vacuum is faced with a high possibility of attacks of high speed flying particles. However, suitable choice of material and structure of the membrane of the balloons will make it sufficiently durable against such attacks regardless of the speed or moment.

A preferred embodiment of the invention has sufficient transparency so as to permit visible light (such as sun light) energy or electromagnetic wave (such as for communication) energy to pass through the multiple balloon layers. Thus, the inventive system enables the spacecraft (such as a communication satellite) to be practically equivalent to the case where the spacecraft is placed in cosmic vacuum.

Another preferred embodiment of the invention enables living beings, such as plants, to survive and grow within the innermost balloon, or structure held therein, when a certain degree of pressure of air or similar gas is maintained therein. Accordingly, agricultural activity can be successfully maintained using the invention.

Thus, the inventive multiple balloon protection system for spacecraft provides a novel environment for work and living in manned or unmanned space vehicles.

EFFECT OF THE INVENTION

The invention enables the space craft to have less stringent design and material requirements for durability against the hazards of space vacuum environment. Hence cost of acquisition is reduced, and spacecraft life is extended. Particularly, when the spacecraft is used to carry living beings, by placing air or its substitute inside the innermost balloon of the inventive system or inside the spacecraft, a wide range of large scale activity can be carried out.

EXPLANATION OF THE PREFERRED EMBODIMENTS

Figure 1:
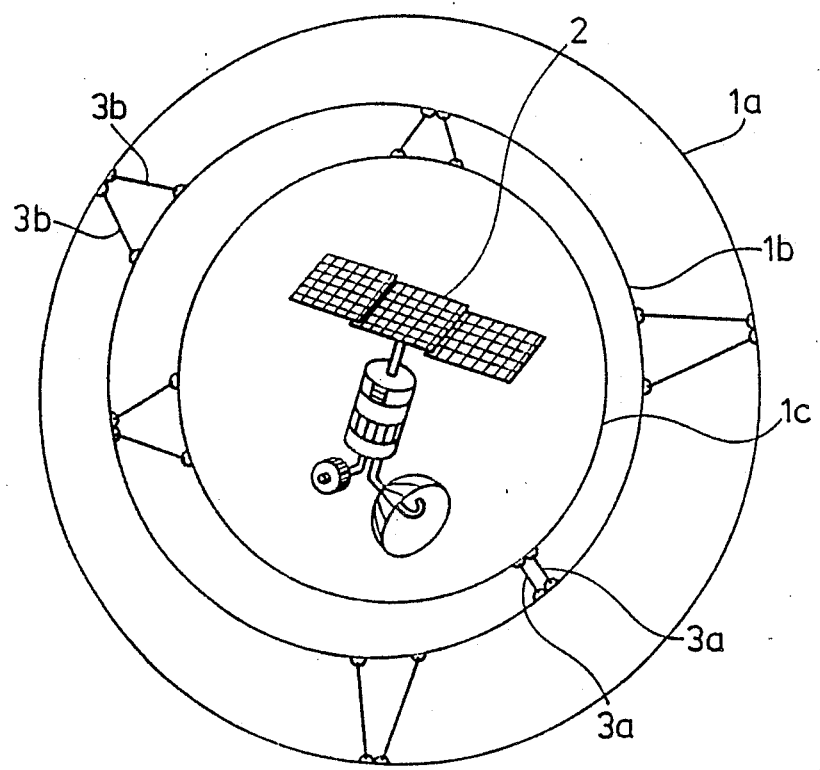
FIG. 1 illustrates a typical style of embodiment of the present invention.

FIG. 1 illustrates a cross-sectional view of a preferred embodiment of the invention, wherein each spherical membrane or balloon (1a, 1b, 1c) forms a multiple balloon system with the progressively smaller balloons being positioned within the next larger balloon, as depicted. A spacecraft (2), in this case a communication satellite, is disposed inside of the innermost internal balloon (1c) with protection being provided by the multiple balloon system. In each inter-balloon space, there is spanned a plurality of strings (3a,3b) which prevent the balloons from clinging to or touching each other. Instead of strings, bars, struts, columns, etc, may be used. There should be at least four string (3a,3b) for each inter-balloon space and preferably be distributed to each corner of a tetrahedral geometry, such as depicted in FIG. 1.

Figure 2:
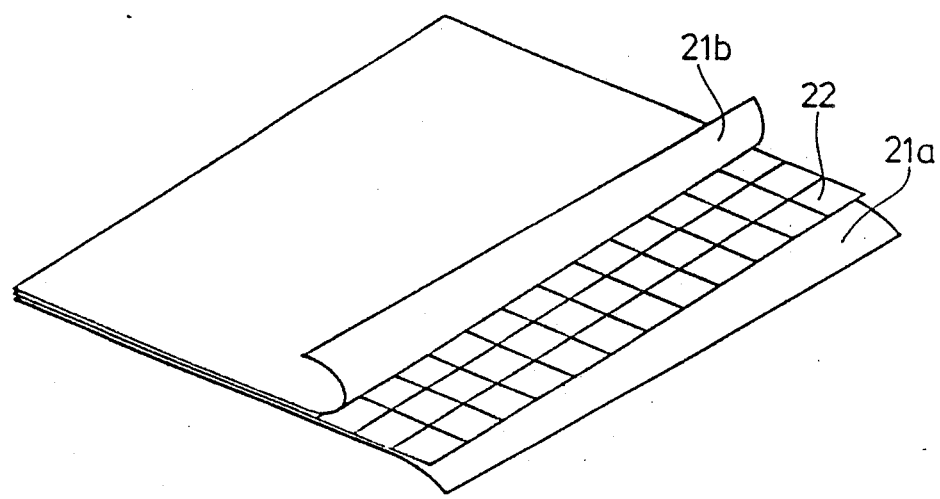
FIG. 2 illustrates a preferred structure of the membrane to be used to make the balloons.

FIG. 2 illustrates an example of a membrane to be used to form the balloons, wherein two sheets made of, for example PVDF (polyvinyliden fluoride) or PTFE (polytetrafluroethylene) member are glued or welded together to sandwitch a stress-bearing mesh 22 made of, for example, glass fibers. The mesh (22) may be a woven or unwoven cloth made of a plurality of glass fibers or other fibers having about 3 $\mu$m average diameter, for example. The total structure of the membrane may be fabricated in such a manner that the core mesh (22) is first immersed in a dispersion solution of emulsion of the membrane material 21a,21b, such as PVDF or PTFE or similar material, then solvent is evaporated and the membrane material is welded by a heating process. Typically when such membrane has about 0.8 mm thickness and about 1.3Kg/m$^2$ density, a pull-strength of no less than 200 Kg/3cm-width is easily attainable. The membrane is similar to that used in forming the ground based pressurized air dome. It also has a proven transparency to light and/or electromagnetic wave energies.

The above discussed membrane for use in the balloons of the invention is one example of various available materials for such purpose. A variety of materials and structures are available for use as the core material (22) and the outer surface layers (21a,21b). However, when major stress is to be placed on transparency for electromagnetic waves, conductive or lossy (i.e. for high frequency signals) materials should not be used for the outer surface layers and core.

In case major stress is placed on having electromagnetic wave disturbing or shielding properties for the balloon system, such as when a communication transponder satellite is juxtaposed next to a large scale digital network exchanger satellite, a metallic or metallized membrane may be used for one or more of the balloons of the system so as to shield the exchanger. In that case, a substantially perfect shielding is desired for the exchanger satellite so as to prevent wideband noise irradiation which will interfere with the link-up receiver of the communication transponder satellite.

An estimation of the necessary strength of the membrane of the balloons respective to its inside to outside pressure difference and isotropic pull-stress to the membrane, and its necessary strength, is given below. A balloon may form a sphere having a diameter 2r. Consider its cross sectional circle as having such a diameter, then, it virtually withstands a force given by its inside to outside pressure difference $\Delta p$ multiplied by the area of the cross sectional circle $\pi r^2$, uniformly distributed across the total length of the edge of the circle, where the balloon membrane actually carries the stress Since the length of the circular edge is $2\pi r$, pulling force per unit width of the membrane is $$f = \frac{\pi r^2 \Delta p}{2\pi r} = \frac{r \Delta p}{2}$$

Suppose maximum withstandable strength of the membrane is 100 Kg/3cm, then the relation between r and $\Delta p$ is given as follows
  $r\Delta p = 2 \times 100$ Kg/3cm $\approx$ 67 Kg/cm.

From this, maximum pressure difference for each size of balloon is given as follows

| 2r (diameter) | p (pressure difference) |
| --- | --- |
| 1.33 m | 1 Kg/cm$^2$ (= 1 atm.) |
| 13.3 m | 0.1 Kg/cm$^2$ (= 0.1 atm.) |
| 133 m | 0.01 Kg/cm$^2$ (= 0.01 atm.) |

This means that when using a balloon system having about 10 m diameter, a double or triple balloon structure can place a pressurized space having about 1/5 atm. pressure inside the inner most balloon with space vacuum on the outside of the outermost balloon. Particular notice should be given to this 1/5 atm. pressure, which could substitute the oxygen partial pressure of ground level. Still increasing further the number of balloons can enable one to have almost 1 atm. air or equivalent inside the innermost balloon. A 10 m diameter spherical space is sufficient for holding a large scale communication satellite, or even a laboratory combined with living space.

A variety of gaseous materials may be used in the inter-balloon spaces, where only a typical gaseous material is necessary. Inactive gases, such as nitrogen or carbon dioxide, etc, may be used for this purpose to save on oxygen. However, gases having high evaporating temperatures are not appropriate because their pressures decrease when the gas temperature drops, such as when the sun is blocked by another space body.

It is also noted that, for the inside of the outermost balloon, it is desirable to not use hydrogen or gaseous material having high permeability across the membrane material. Otherwise, the gas may escape through the membrane and will not retain sufficient pressure for a long time, as would be desired.

Inside the innermost balloon, the spacecraft is installed. If the spacecraft carries living beings, the occupying gas may be oxygen or oxygen based mixture, such as including carbon dioxide, to enable the survival of the living beings. If the living beings are plants, there is the capability of photochemical regeneration of carbon. The gas may include helium to increase the total pressure at minimum cost to weight. However, when the space craft contains inanimate objects such as instruments and equipment, non-oxygen gas, such as nitrogen or inactive gas, or mixtures thereof may be used.

However, the kind of gas or gas mixture which is used in the interballoon spaces as well as inside the innermost balloon is optional.

A preferred embodiment comprises a TEFLON (PTFE) coated glass fabric for the concentric balloons material, with nitrogen gas, with a balloon outer diameter of 10 m. and a communications satellite in the center thereof. On the ground, the fabric is cut into a plurality of pentagonal pieces, and heat welded together such as in the manner of a soccer ball being assembled, with one section being left open to enable the communications satellite to be placed in the innermost balloon, and in place a cannister of nitrogen gas therein. Then, the one open section is heat welded and the completed multiple concentric balloons are folded, also, such as in the manner of the soccer ball when it is folded for shipment to the retailer. The folded balloons are then placed in the hold of the rocket, shot into the desired space orbit, and then, placed into orbit by shooting out from the rocket hold. Then, the cannisters are opened upon signal and nitrogen used to blow up the balloons to desired pressures.

When the spacecraft is a communications satellite or an astronomical observation station, its attitude control is important. In conventionally designed stand alone spacecraft, control of attitude is attained by use of small rocket engines or 3-axis flywheels. Any perturbation caused by particle wind from the sun, moon gravitation, or imperfection of the spherical shape of the earth, is absorbed or countered by the rocket engines and flywheels with the flywheels regenerating excess or insufficient rotational movement for each axis.

In an embodiment of the invention, the spacecraft inside the innermost balloon has its attitude controlled by ventilating or mixing the gaseous materials by means of a fan or screw propeller. No material is lost. Since the total balloon system is an independent body in free space, total angular movement is preserved. Attitude control, however, begins with distribution of angular moment between the space craft and the balloon system, including the gaseous materials, so as to cause angular movement, and ends with back distribution of the moment to stop the movement. During such a procedure, total angular moment still is preserved and only a small amount of energy loss caused by mixing of the gases, takes place, and no adverse side effects remain. Since energy can be acquired during orbitral action for basically any amount by means of solar cells, etc., this method enables design of attitude control which has not or substantially no loss of material. Only a small loss of energy results. Thus, operating life of the satellite is substantially lengthened and the spacecraft is not limited, as to lifetime, by the amount of propellant that it can carry into space.

As seen in the above embodiment, the invention enables a variety of novel and favorable schemes as to spacecraft structure, acquisition and maintenance. The disclosure is as to one embodiment. It would be apparent to the worker skilled in the art that there are numerous variations of the invention, all of which are to be considered to be within the spirit and scope of the invention.

I claim:

1. A spacecraft protection system for use in outer space comprising at least a gas filled, gas tight innermost balloon for containing a spacecraft therein; and a gas filled, gas tight next outer balloon surrounding said innermost balloon, wherein the gas pressure in the innermost balloon is higher than the gas pressure in the next outer balloon.

2. The system of claim 1, having at least 4 strings in each interballoon space so as to insure maintaining of spacing and so as to prevent the balloons from touching each other.

3. The system of claim 1, wherein all of said balloons are substantially transparent to the propagation of electromagnetic waves.

4. The system of claim 1, wherein at least one of said balloons substantially prevents propagation of electromagnetic waves.

5. The system of claim 1, wherein inactive gas is used as a major component in the inter-balloon space.

6. The system of claim 1, wherein air or oxygen air substitute is contained inside the innermost balloon so as to allow living beings to survive therein.

7. The system of claim 1, wherein the balloons are made of a membrane having woven fibrous mesh as core material for stress bearing.

8. The system of claim 1, wherein said spacecraft is controlled as to attitude by mixing gases contained in said balloon without any substantial loss of said gases.

9. The system of claim 1, having at least 4 bars in each interballoon space so as to insure maintaining of spacing and so as to prevent the balloons from touching each other.

10. The system of claim 1, having at least 4 columns in each interballoon space so as to insure maintaining of spacing and so as to prevent the balloons from touching each other.

11. The system of claim 1, wherein inactive gas is used as a major component in the inside of the innermost balloon.

12. The system of claim 1, wherein the balloon are made of a membrane having unwoven fibrous mesh as core material for stress bearing.

* * * * *